(12) United States Patent
Morrow

(10) Patent No.: US 10,338,543 B2
(45) Date of Patent: Jul. 2, 2019

(54) INTEGRATED MODEL PREDICTIVE CONTROL AND ADVANCED PROCESS CONTROL

(71) Applicant: Invensys Systems, Inc., Foxboro, MA (US)

(72) Inventor: Alan B. Morrow, Cumberland, RI (US)

(73) Assignee: Schneider Electric Software, LLC, Lake Forest, CA (US)

(*) Notice: Subject to any disclaimer, the term of this patent is extended or adjusted under 35 U.S.C. 154(b) by 928 days.

(21) Appl. No.: 14/636,807

(22) Filed: Mar. 3, 2015

(65) Prior Publication Data

US 2015/0286192 A1 Oct. 8, 2015

Related U.S. Application Data

(60) Provisional application No. 62/007,633, filed on Jun. 4, 2014, provisional application No. 61/975,442, filed on Apr. 4, 2014.

(51) Int. Cl.
*G05B 13/04* (2006.01)

(52) U.S. Cl.
CPC ................... *G05B 13/048* (2013.01)

(58) Field of Classification Search
CPC .................................................. G05B 13/048
See application file for complete search history.

(56) References Cited

U.S. PATENT DOCUMENTS

| | | | | |
|---|---|---|---|---|
| 6,721,609 B1* | 4/2004 | Wojsznis | ........... | G05B 13/0275 700/28 |
| 7,050,863 B2* | 5/2006 | Mehta | ..................... | G05B 11/32 700/19 |
| 7,194,318 B2* | 3/2007 | Attarwala | ............ | G05B 13/048 700/28 |
| 7,591,440 B2* | 9/2009 | Morrow | .................. | B02C 23/12 106/756 |
| 7,933,849 B2* | 4/2011 | Bartee | ........................ | C12P 7/06 706/19 |
| 2004/0049300 A1* | 3/2004 | Thiele | .................... | G05B 11/32 700/29 |
| 2007/0168057 A1* | 7/2007 | Blevins | ................ | G05B 13/022 700/53 |
| 2008/0103747 A1* | 5/2008 | Macharia | ............. | G05B 13/048 703/11 |
| 2010/0204808 A1* | 8/2010 | Thiele | .................... | G05B 17/02 700/30 |
| 2012/0109620 A1* | 5/2012 | Gaikwad | ............. | G05B 13/048 703/21 |

* cited by examiner

*Primary Examiner* — Aniss Chad
(74) *Attorney, Agent, or Firm* — Stinson LLP

(57) ABSTRACT

Controlling and optimizing industrial processes by integrating MPC-based approaches and expert system approaches. At least two different control variables with identical models are used. An expert system adjusts at least one of the control variables to change a setpoint or range or the like while standard MPC techniques change another control variable to address appropriate classes of control problems.

17 Claims, 6 Drawing Sheets

INTEGRATED MODEL PREDICTIVE CONTROL AND ADVANCED PROCESS CONTROL

CROSS-REFERENCE TO RELATED APPLICATIONS

This application claims the benefit of U.S. Provisional Application Ser. No. 61/975,442, filed Apr. 4, 2014, and U.S. Provisional Application Ser. No. 62/007,633, filed Jun. 4, 2014. The entire contents of the above applications are hereby incorporated by reference.

BACKGROUND

Industrial processes are commonly controlled by computer-based systems such as Distributed Control Systems (DCS) or Programmable Logic Controllers (PLC). These systems receive input from instruments that measure process variables, such as temperatures, pressures, flow rates, and the like. Some systems use a layer of control known as Basic Regulatory Control (BRC), in which algorithms use the received inputs to calculate how to manipulate a single process actuator for the purpose of controlling a process variable. The industry standard Proportional-Integral-Derivative (PID) algorithm is commonly applied at this level. A typical PID controller generally has a desired setpoint for a process variable and one output to an actuator or to another PID controller.

Advanced Process Control (APC) technology provides greater capability compared to the basic functionality of PID controllers. Two broad classes of APC technology are independently applied in industrial processes: Model Predictive Control (MPC) and rule-based control. Although MPC can handle large systems through scalable algorithms, it does not perform well when its models cannot accurately predict variable trajectories in all operating regions. A major weakness of rule-based approaches is that a human expert often cannot describe a process as precisely as a mathematical model, which leads to non-optimal process operation by giving the process too much cushion. Furthermore, a large rule-based system that must consider many inputs and move many outputs can become unwieldy with thousands of rules that must be written to address process interactions. In other words, the two classes of APC technology are utilized independently of each other, requiring process operators to choose only one technology and its respective weaknesses.

In addition, human operators cannot monitor and adjust control parameters as frequently and accurately as APC technologies, which results in great difficulty operating processes at their optimum operation points. While operators can decide to push processes and process equipment to their limits, such an approach is inefficient and leads to equipment or process breakdowns. Such downtime leads to further costs and lost profits. On the other hand, operators can keep processes well within their limits and operate with a cushion but this can also lead to lost profits. Therefore, operators are left to choose between two non-optimal approaches.

SUMMARY

Aspects of the present invention allow process operators to push processes to their limits in order to reach the optimum operation point without worrying about the process or equipment breaking down. In an embodiment, an MPC component is configured such that a control variable (CV) is entered twice with identical models. One instance of the CV has setpoints and/or constraints set by an engineer or operator. A second instance of the CV has setpoints and/or constraints set by an expert system. When a process nears a region of instability, an expert system activates to drive the process back into the stable region. This fail-safe allows operators to correct variable constraints without the process or equipment breaking down.

In an aspect, a process control system includes an expert component configured to implement one or more rules. The rules indicate an incipient overload operating point of a process and the expert component provides electronic data representing an expert value corresponding to a variable of the process. The process control system further includes a model predictive control (MPC) component configured to implement a mathematical model describing the process. The MPC component implements the mathematical model utilizing electronic data representing an operator value corresponding to the variable of the process and provides electronic data representing a control output to an actuating device. The actuating device implements the control output in the process.

In another aspect, a process control system includes a memory device storing a first constraint value of a first instance of a controlled variable (CV) of a process, a second constraint value of a second instance of the CV of the process, and a mathematical model. The mathematical model represents at least a subset of the process and has an objective function for determining an optimal trajectory of at least one manipulated variable (MV) of the process. The process control system further includes a sensing device for measuring a present value of the MV and a processor coupled to the memory device and the sensing device. The processor executes program code configured to predict a future value of the CV as a function of past measured values of the at least one MV and feed-forward (FF) variables, and the present value of the CV, the at least one MV, and the FF variables in accordance with the model. Some model forms may also use past values of the CV to predict a future value of the CV. The program code is further configured to determine an error value of the CV, determine control values as a function of the model and the first constraint value when the error value is less than a threshold value, and determine control values as a function of the model and the second constraint value when the error value is greater than or equal to the threshold value.

In yet another aspect, a process control system includes a model structure comprising a first model predictive control (MPC) model representing at least a subset of a process and a second MPC model representing at least a subset of the process. The model structure further includes a first instance of a first controlled variable (CV) of the process corresponding to the first MPC model, a second instance of the first CV, and a first instance of a second CV of the process corresponding to the second MPC model. The first MPC model predicts the first CV responsive to a manipulated variable (MV) of the process and the second MPC model predicts the second CV responsive to the MV. The first instance of the first CV is constrained by a first constraint value and the second instance of the first CV is constrained by a second constraint value. The process control system further includes an objective function module for determining an optimal trajectory of the MV and a rules module comprising one or more rules for identifying a mode change in which at least one of the first MPC model and the second MPC model cannot predict their respective CVs with acceptable accuracy. For example, such a mode change may indicate an incipient overload operating point in the process illustrated by FIG. 3. The process control system also includes a processor executing program code configured to determine the optimal trajectory of the MV according to the objective function module and the CVs. The second instance of the first CV does not contribute to the objective function module when each of the first MPC and the second MPC predict their respective CVs with acceptable accuracy. The first instance of the first CV does not contribute to the objective function module when at least one of the first MPC and the second MPC cannot predict their respective CVs with acceptable accuracy.

Still other aspects, embodiments, objects, and features of the present invention will be apparent and in part pointed out hereinafter.

BRIEF DESCRIPTION OF DRAWINGS

Corresponding reference characters indicate corresponding parts throughout the drawings.

DETAILED DESCRIPTION

To provide an overall understanding, certain illustrative embodiments will now be described; however, it will be understood by one of ordinary skill in the art that the systems, methods, and manufactures described herein may be adapted and modified to provide systems, methods, and manufactures for other suitable applications and that other additions and modifications may be made without departing from the scope of the systems, methods, and manufactures described herein.

Unless otherwise specified, the illustrated embodiments may be understood as providing exemplary features of varying detail of certain embodiments, and therefore, unless otherwise specified, features, components, modules, and/or aspects of the illustrations may be otherwise combined, separated, interchanged, and/or rearranged without departing from the disclosed systems, methods, or manufactures. Additionally, the shapes and sizes of components are also exemplary and unless otherwise specified, may be altered without affecting the scope of the disclosed and exemplary systems, methods, or manufactures of the present disclosure.

Figure 1:
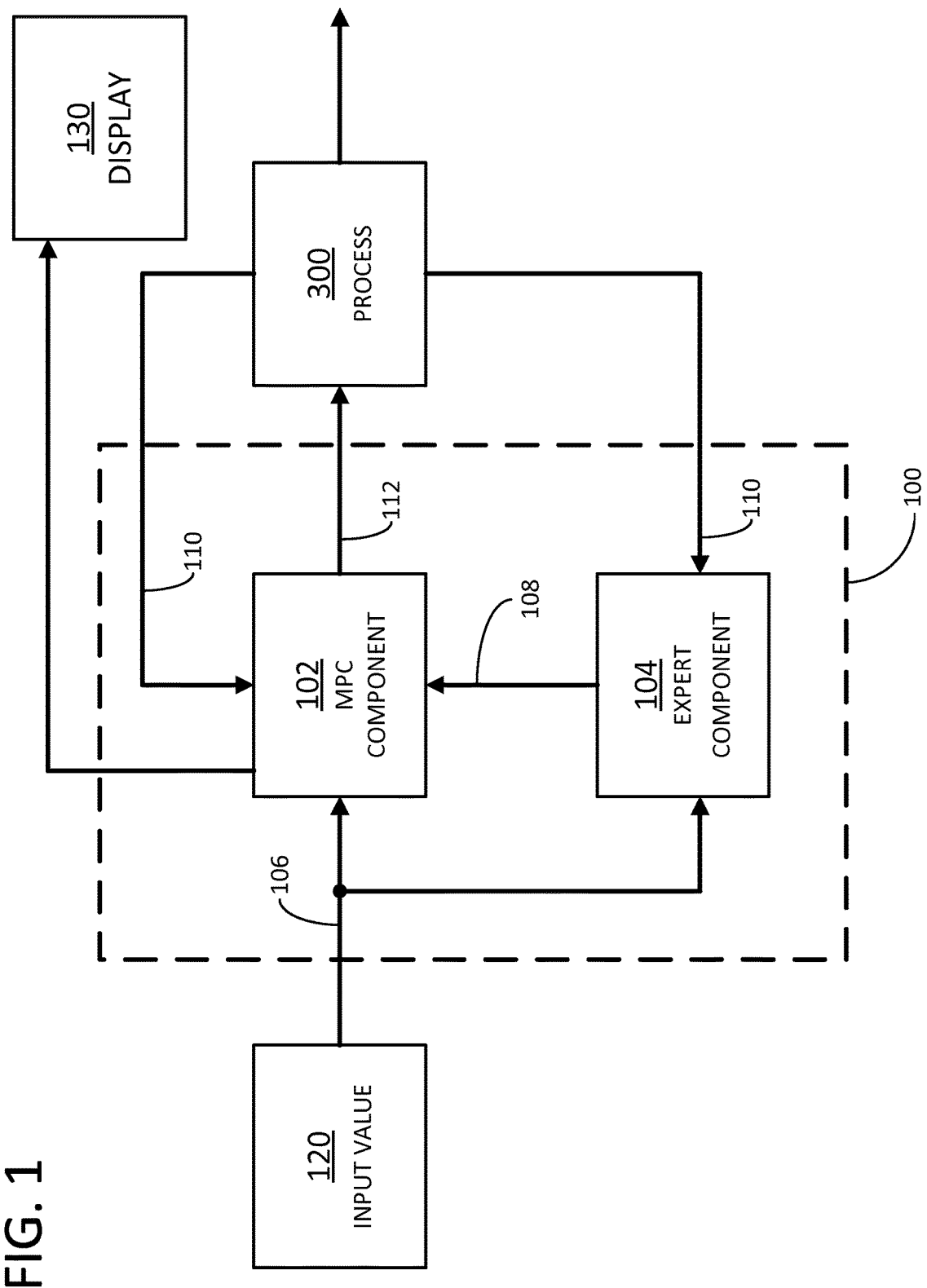
FIG. 1 is a diagram of an integrated control system in accordance with an embodiment of the invention.

FIG. 1 illustrates an integrated control system 100 in accordance with an embodiment of the invention. The integrated control system includes a Model Predictive Control (MPC) component 102 and an expert component 104. Integrated control system 100 utilizes an operator input 106 that represents an input value 120. Integrated control system 100 also utilizes an expert input 108 and a feedback input 110 to produce a manipulated variable (MV) 112, which contributes to controlling a ball mill process 300, for example.

Referring again to FIG. 1, a connection between the input value 120 and the MPC component 102 provides a communication channel for the operator input 106. A connection between input value 120 and the expert component 104 also provides a communication channel for operator input 106. A connection between expert component 104 and MPC component 102 provides a communication channel for the expert input 108. Connections between the ball mill process 300 and MPC component 102 and between ball mill process 300 and expert component 104 each provide a communication channel for feedback input 110. A connection between MPC component 102 and ball mill process 300 also provides a communication channel for the manipulated variable 112.

Referring further to FIG. 1, MPC component 102 is adapted for using mathematical models to calculate optimal manipulated variable values in order to maximize an objective function over a defined time horizon and generating electronic data for devices that effect physical changes in a real-world process. In addition to manipulated variables, MPC component 102 includes controlled variables (CV) that are desired to be controlled to a setpoint or range and feedforward variables (FV) that are not controlled and will disturb the process when they change. MPC component 102 utilizes double-entry CVs, further described below. In an embodiment, MPC component 102 uses past data from its independent variables (i.e., manipulated variables and feedforward variables) to mathematically predict (e.g., using an algorithm) the future trajectories or values of the CVs. In another embodiment, an optimization algorithm embodied in computer-executable instructions executing on MPC component 102 calculates the optimum trajectory of the manipulated variables over a defined time horizon in order to maximize the objective function. In an exemplary embodiment, MPC component 102 executes algorithms that calculate the optimum manipulated variable moves while keeping CVs at a setpoint or within constraints (e.g., constraint values), prioritizing CVs when it is not possible to keep all of the CVs within their constraints or at setpoints, and driving a process (e.g., ball mill process 300) to the most profitable operating point.

In accordance with aspects of the present invention, MPC component 102 takes various forms, including but not limited to, Finite Impulse Response (FIR), Auto-Regressive with eXogeneous inputs (ARx), neural networks, and the like. In one embodiment, MPC component 102 is embodied in computer-executable instructions executing on a special purpose computer. In other embodiments, MPC component 102 is implemented by digital or analog electronic circuitry. In additional embodiments, MPC component 102 includes a memory device in which CV constraints, limits, and predictions are available in memory and displayed via a graphical user interface, for example. Further aspects of MPC component 102 and sub-components are described below.

The expert component 104 of FIG. 1 is adapted for providing expert system or rule-based control. In an embodiment, expert component 104 uses rules developed by human experts to determine when to adjust actuators and setpoints of a process (e.g., ball mill process 300). Preferably, expert component 104 implements Fuzzy Logic Control (FLC) rules. An exemplary FLC rule is represented as "IF the temperature is very hot AND the vessel pressure is high THEN increase cooling water a LARGE amount." It is to be understood by one skilled in the art that other types of rule-based systems, such as those using rules that can be represented using IF-THEN-ELSE logical structures that may be combined with engineering calculations, are also implemented by expert component 104 in other embodiments. In yet another embodiment, expert component 104 implements a dynamic mathematical process model. In some embodiments, rule-based or FLC systems can be considered as embodying approximate process models. In a further embodiment, expert component 104 is embodied in computer-executable instructions executing on a special purpose computer. In other embodiments, expert component 104 is implemented by digital or analog electronic circuitry. Further aspects of expert component 104 are described below.

Still referring to FIG. 1, operator input 106 provides MPC component 102 and expert component 104 with input value 120. In an embodiment, operator input 106 is electronic data carried by a communicative connection, including those that operate according to analog, digital, pulse, serial, and/or parallel techniques, such as the HART® communications protocol, for example. In an aspect, operator input 106 represents CV constraints or setpoints, such as maximum equipment power limits, process temperatures, product quality setpoints or constraints, and the like.

The expert input 108 represents CV constraints or setpoints provided by expert component 104. In an embodiment, expert input 108 is electronic data carried by a communicative connection, including those that operate according to analog, digital, pulse, serial, and/or parallel techniques, such as the HART® communications protocol, for example. In an aspect, the CV constraints or setpoints represented by expert input 108 includes, but is not limited to, maximum equipment power limits, process temperatures, and product quality setpoints or constraints.

With continued reference to FIG. 1, feedback input 110 provides electronic data from devices (e.g., sensors, actuators) that are a part of ball mill process 300, which represents physical characteristics of ball mill process 300. In an embodiment, feedback input 110 is electronic data carried by a communicative connection, including those that operate according to analog, digital, pulse, serial, and/or parallel techniques, such as the HART® communications protocol, for example. In an aspect, feedback input 110 represents feedforward variables or disturbance variables, which are utilized by MPC component 102 and/or expert component 104 to predict a future value of a CV. In accordance with some embodiments, integrated control system 100 is adapted to operate without utilizing feedback input 110.

The manipulated variable 112 provides a value representing a physical manipulation of devices (e.g. actuators) that are a part of ball mill process 300. In an embodiment, manipulated variable 112 is provided as electronic data carried by a communicative connection, including those that operate according to analog, digital, pulse, serial, and/or parallel techniques, such as the HART® communications protocol, for example. In exemplary embodiments, manipulated variable 112 provides a value representing a feed rate setpoint, a flow setpoint, a damper position, and the like. In further embodiments, manipulated variable 112 is referred to as a control output. In another embodiment, manipulated variable 112 has constraints.

The input value 120 provides data representing a constraint and/or setpoint determined by a human engineer or operator of ball mill process 300. In an embodiment, a constraint of input value 120 represents equipment limitations of a device in ball mill process 300. In another embodiment, more than one input value 120 is available. In a further embodiment, input value 120 is stored as electronic data on a tangible non-transitory computer-readable medium. A non-limiting example of this embodiment includes input value 120 being stored on a special purpose computer and representing a constraint value inputted via a graphical user interface of the special purpose computer.

A display 130 is also included in the embodiment of FIG. 1. The display 130 is adapted for providing graphical information about integrated control system 100 to a user. In an exemplary embodiment, display 130 is a graphical user interface (GUI) and displays CV constraints, limits, and predictions available in a memory device of integrated control system 100, MPC component 102, and expert component 104. By way of example and not limitation, display 130 includes computer monitors, mobile devices, matrix displays, seven-segment displays, light-emitting diodes, and the like.

In the embodiment of FIG. 1, ball mill process 300 is a ball mill comminution process commonly used in the mining industry, as further described below. It is to be understood by one skilled in the art that ball mill process 300 may represent other processes that change or refine raw materials to create end products. Exemplary processes include, but are not limited to, those in the chemical, oil and gas, food and beverage, pharmaceutical, water treatment, and power industries.

In an aspect, integrated control system 100 is adapted for controlling and optimizing an industrial process (e.g., ball mill process 300) according to an Advanced Process Control (APC) approach in which at least part of the industrial process can be described using mathematical models found in MPC technologies and at least part of the process experiences excursions or mode changes that cannot be predicted by MPC models, but can be indicated or predicted using rules. In an embodiment, MPC component 102 is configured such that a control variable is entered twice with identical models to create a double-entry control variable. The first instance of the control variable is used "normally," where an engineer or operator sets its setpoint or constraints. For example, an engineer or operator enters setpoints and/or constraints as input value 120, which are then provided to MPC component 102 and expert component 104 as operator input 106. The second instance of the control variable has its setpoint or constraints set by expert component 104 when expert component 104 detects a condition that requires action. Expert component 104 detects a condition that requires action and then outputs a single setpoint or constraint to MPC component 102 via expert input 108. MPC component 102 then uses its existing models and objective function to calculate how to optimally move the manipulated variables, account for process interactions, and keep other controlled variables within constraints or at setpoints. MPC component 102 outputs the result as manipulated variable 112, which at least partially controls ball mill process 300. In an embodiment, MPC component 102 transforms operator input 106 and expert input 108 into manipulated variable 112. In another embodiment, MPC component 102 utilizes more than one double-entry control variable wherein the expert component 104 provides a setpoint or constraint as expert input 108 for each double-entry control variable, as further described below.

In another aspect, MPC component 102 is configured to predict a future value of the CV as a function of past measured values of the manipulated variable (MV) and feedforward (FF) variables and the present value of the CV, the manipulated variable, and the feedforward variables in accordance with the model. In a further embodiment, MPC component 102 uses past values of the CV to predict a future value of the CV.

In an additional aspect, integrated control system 100 of FIG. 1 considers multiple CVs and simultaneously manipulates multiple PID setpoints or actuators (i.e., manipulated variables) to achieve objectives of ball mill process 300. For example, to achieve objectives of ball mill process 300, integrated control system 100 considers such factors as unit economics (e.g., maximization of profit), operation within equipment and environmental constraints, operation within product quality constraints or at product quality setpoints, and process stability. Integrated control system 100 considers such factors through the use of algorithms that are more sophisticated than the standard PID algorithm found in typical DCS-based and PLC-based systems. Beneficially, integrated control system 100 provides greater capability compared to these systems.

Figure 2:
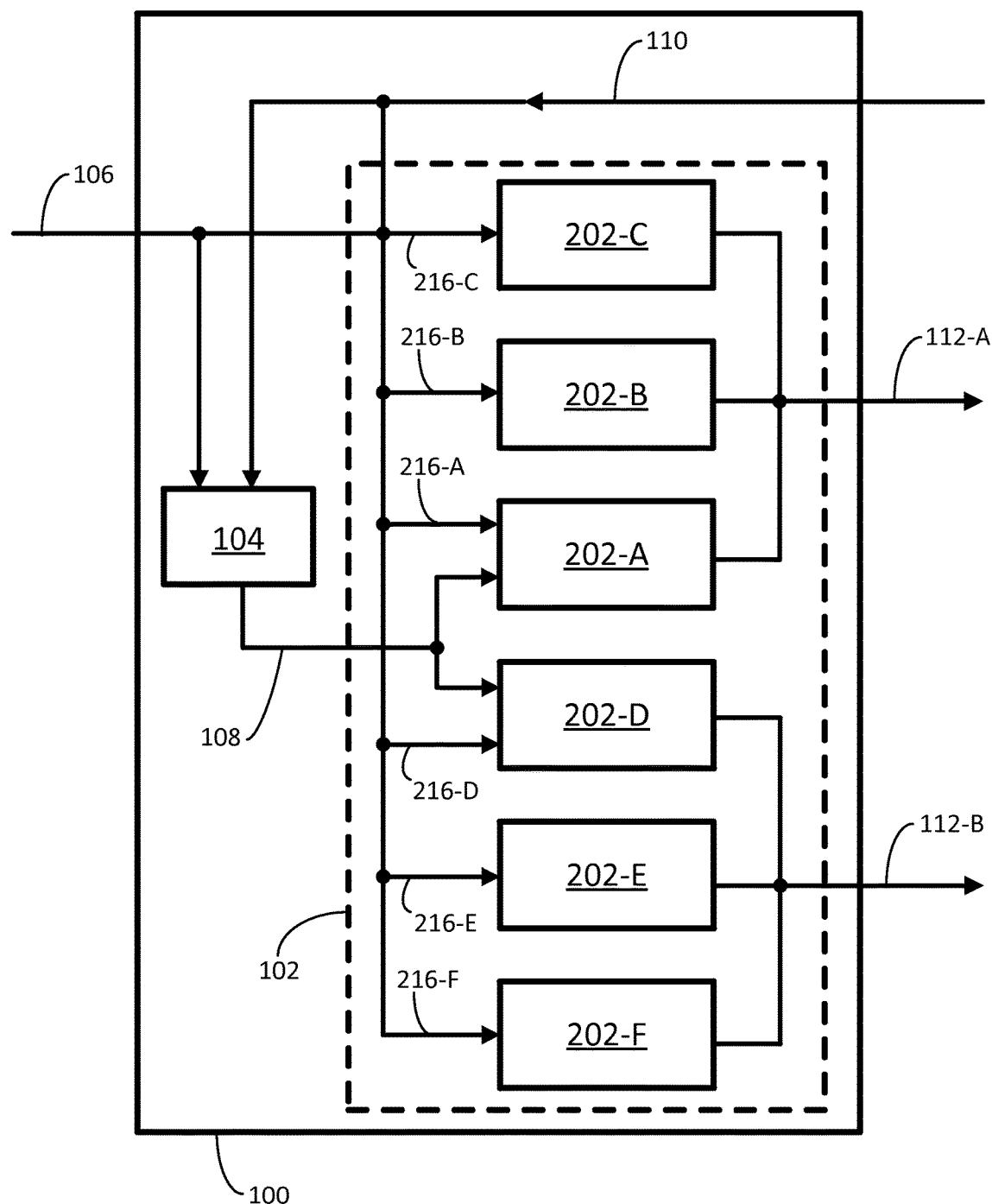
FIG. 2 is a diagram of a double-entry control variable integrated control system in accordance with an embodiment of the invention.

Now referring to FIG. 2, integrated control system 100 includes expert component 104 and MPC component 102. MPC component 102 further includes model components 202-A, 202-B, 202-C, 202-D, 202-E, and 202-F. Operator input 106 and feedback input 110 are provided to expert component 104. Expert input 108 is provided to model components 202-A and 202-D. Operator input 106 and feedback input 110 are each provided to model components 202-A, 202-B, 202-C, 202-D, 202-E, and 202-F via combined inputs 216-A, 216-B, 216-C, 216-D, 216-E, and 216-F, respectively. Although the embodiment of FIG. 2 illustrates operator input 106 and feedback input 110 merging to form combined inputs 216, it is contemplated that in other embodiments operator input 106 and feedback input 110 are each provided to model components 202 via separate connections. Manipulated variable 112-A (e.g., representing a fresh feed rate) is provided as a combined output from model components 202-A, 202-B, and 202-C. Manipulated variable 112-B (e.g., representing a ball mill discharge water value) is provided as a combined output from model components 202-D, 202-E, and 202-F.

The model components 202 of FIG. 2, each use a mathematical model to calculate optimal values of either manipulated variable 112-A or manipulated variable 112-B in order to maximize an objective function over a defined time horizon. In an exemplary embodiment, operator input 106, expert input 108, feedback input 110, and combined inputs 216 include data representing a ball mill power CV (e.g., low constraint), a cyclone feed density CV (e.g., high constraint), and a product particle size CV (e.g., setpoint). In further embodiments, feedback input 110 includes feedforward variables or disturbance variables to help predict the future value of a CV. It is to be understood by one skilled in the art that feedforward variables or disturbance variables are not strictly required. In the exemplary embodiment, manipulated variable 112-A represents the flow rate of a fresh feed stream into a ball mill and is referred to as a fresh feed rate MV. Further, manipulated variable 112-B represents the flow rate of a water stream into a ball mill discharge sump and is referred to as a ball mill discharge water MV. In some embodiments, the integrated control system 100 of FIG. 2 is referred to as a model-variable correlation base.

In an embodiment, model component 202-A is adapted to receive combined input 216-A, which includes a value for a CV (e.g., ball mill power) that has constraints set, for example, by an operator or engineer based equipment limitations of ball mill process 300. Model component 202-A is also adapted to receive expert input 108, which includes a value for the same CV (e.g., ball mill power) that has constraints set by an expert system. Model component 202-A is adapted to utilize both combined input 216-A and expert input 108 to calculate optimal values of manipulated variable 112-A (e.g., fresh feed rate). This technique, referred to as a double-entry control variable, is used to integrate MPC and expert system technologies. A CV with constraints set, for example, by an operator or engineer may be referred to as "CV 1a" and a CV with constraints set by an expert system may be referred to as "CV 1b" in accordance with some embodiments of the invention. The MPC-augmented integrated control system 100 of FIG. 2 illustrates that various model components 202, which describe at least a part of ball mill process 300, are used to predict the change in the CVs of the modeled system that will be caused by changes in the MVs.

In an embodiment, the double-entry control variable technique for model component 202-A of FIG. 2 is adapted for utilizing a ball mill power CV 1a (i.e., with operator-set constraints) from combined input 216-A in regions where its constraints allow model component 202-A to accurately describe its portion of ball mill process 300 and thus also accurately predict the ball mill power CV value that will result from manipulation of the values of the fresh feed rate MV. The double-entry control variable technique for model component 202-A is also adapted for utilizing a ball mill power CV 1b (i.e., with constraints set by an expert system) from expert input 108 in situations where a constraint set by an operator via CV 1a causes model component 202-A to inaccurately describe its portion of ball mill process 300 and thus inaccurately predict the ball mill power CV value that will result from manipulation of the values of the fresh feed rate MV. The double-entry control variable technique allows integrated control system 100 to operate in regions where model component 202-A is accurate and allows expert component 104 to feed information regarding process stability and loading back to ball mill process 300. Beneficially, integrated control system 100 implementing the double-entry control variable technique results in significant improvements in unit or process operation as well as increased profit and efficiency.

Figure 3:
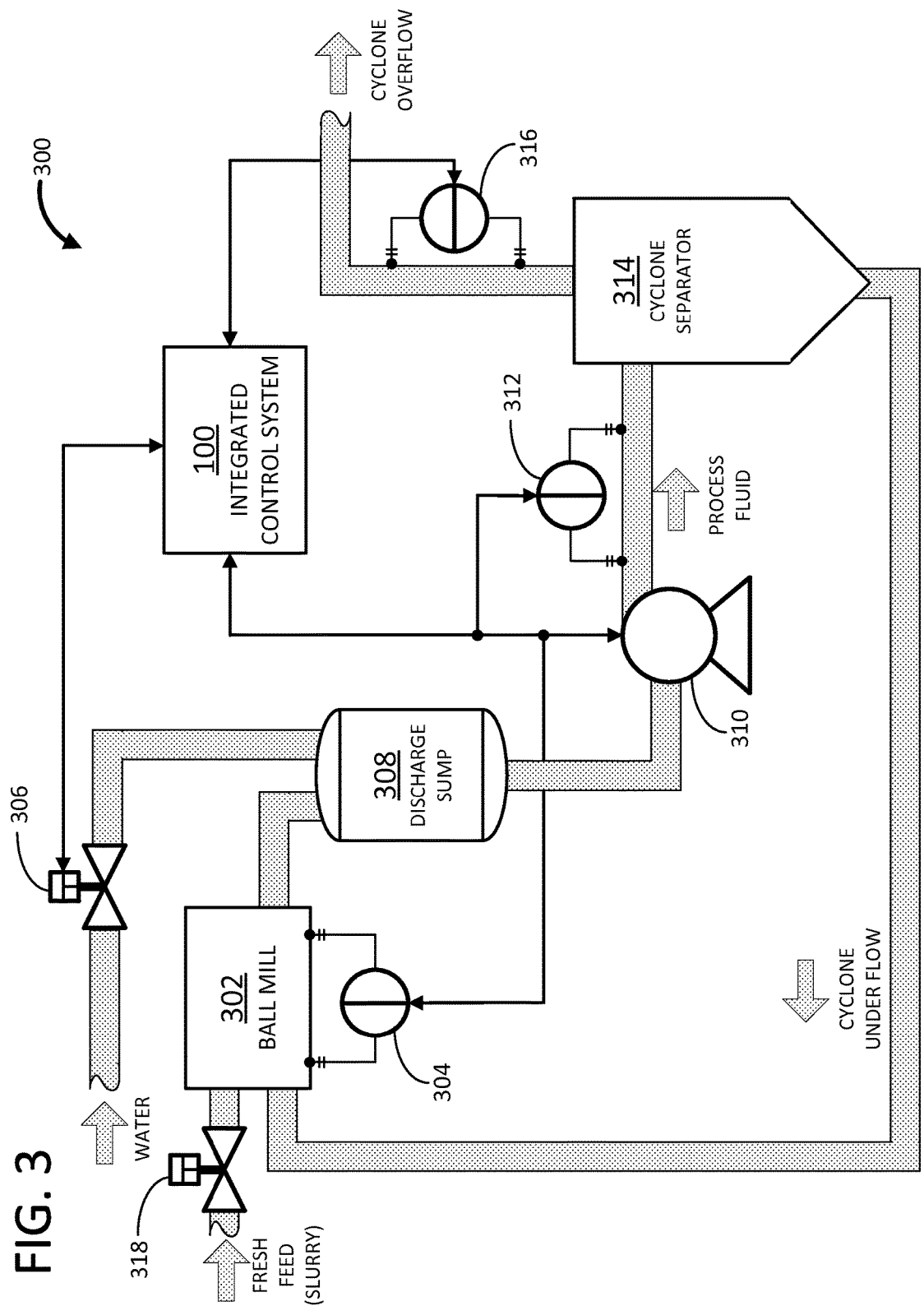
FIG. 3 is a diagram of an exemplary ball mill process and integrated control system in accordance with an embodiment of the invention.

FIG. 3 illustrates integrated control system 100 within an exemplary simplified closed-circuit ball mill comminution process 300 in accordance with an embodiment of the invention. The ball mill process 300 includes a ball mill 302, a ball mill sensor 304, a water stream valve 306, a discharge sump 308, a pump 310, a density sensor 312, a cyclone separator 314, a particle size sensor 316, and fresh feed valve 318.

The integrated control system 100 is communicatively connected to the ball mill 302, the ball mill sensor 304, the water stream valve 306, the pump 310, the density sensor 312, the particle size sensor 316, and the fresh feed valve 318. The communicative connections may include those that operate according to analog, digital, pulse, serial, and/or parallel techniques, such as the HART® communications protocol, for example. Ball mill 302 receives a fresh feed (e.g. slurry) stream and a cyclone underflow (e.g. recycle) stream of process fluids. Ball mill sensor 304 is connected to ball mill 302 such that a change of a physical property associated with ball mill 302 causes an associated change in a property of ball mill sensor 304. Discharge sump 308 receives an output stream from ball mill 302 as well as a water stream that has its flow rate controlled by water valve 306. The output of discharge sump 308 flows through pump 310 into cyclones 314. Between pump 310 and cyclones 314, density sensor 312 is connected to a pipe carrying the output of discharge sump 308. An underflow output of cyclones 314 returns to ball mill 302, while an overflow output continues to another part of ball mill process 300. Particle size sensor 316 is connected to a pipe carrying the overflow output of cyclones 314.

Referring further to FIG. 3, ball mill sensor 304, water valve 306, pump 310, density sensor 312, particle size sensor 316, and fresh feed valve 318 are adapted for measuring physical changes in a process and/or physically manipulating portions of ball mill process 300 in order to achieve physical changes. For example, ball mill sensor 304 is configurable for measuring an electrical voltage applied to ball mill 302 and reporting (e.g., transmitting data) the measurement to integrated control system 100. Density sensor 312 is configurable for measuring a density of particles in the process fluid stream and particle size sensor 316 is configurable for measuring a size of particles in the cyclone overflow stream. Density sensor 312 and particle size sensor 316 are each configurable for reporting measurements to integrated control system 100. It is contemplated that other devices or instruments may be used for measurement purposes, including but not limited to, thermocouples, Coriolis flow tubes, radar emitters and receivers, and the like. Further, transducers and/or converters may be utilized to convert one type of signal into another type of signal (e.g., translate a mechanical signal into an electrical signal). Water valve 306, fresh feed valve 318, and/or pump 310 are utilized to, for example, restrict the flow of the process fluid through piping in order to optimize ball mill process 300. It is to be understood by one skilled in the art that other devices may be used to cause physical changes, including but not limited to actuators, louvers, solenoids, and the like.

In operation of ball mill process 300, the fresh feed stream of ore is, for example, a slurry with particles having a mean diameter of about 0.5 inches. The fresh feed stream and the cyclone underflow stream are routed into ball mill 302, which is cylindrical, contains steel balls, and rotates at a fixed speed in the illustrated embodiment. The liners of ball mill 302 are designed so that the slurry and steel balls are lifted up by the rotation of ball mill 302 and then fall or slide down to the bottom of ball mill 302. The weight of the steel balls and slurry break and grind the slurry particles into smaller particles. The slurry exits ball mill 302 and flows into discharge sump 308. Water from the water stream is added to discharge sump 308 to mix with the slurry from ball mill 302. The resultant slurry is then pumped, via pump 310, to cyclone separator 314. Between discharge sump 308 and cyclone separator 314, density sensor 312 measures the density of the slurry. Cyclone separator 314 segregates the slurry stream by size fraction. The oversized particles are returned to ball mill 302 via the underflow (i.e., recycle) stream for further grinding. The smaller sized particles are routed to downstream processing units via the product stream. The mean diameter of the particles in the product stream is 0.015 inches in this example. A subset of the typical process instrumentation is shown in FIG. 3. Integrated control system 100 receives data from ball mill sensor 304, density sensor 312, and particle size sensor 316 about physical characteristics of process 300. Integrated control system 100 utilizes this information and implements an double-entry control variable MPC approach and continuously utilizes data about the values measured by the sensors and then sends a control signal to ball mill 302, water valve 306, fresh feed valve 318, and pump 310, which act on various components of ball mill process 300 to correct any deviation from a desired preset value or process objective.

A "ball mill overload" condition is known to occur in ball mill process 300 when the ore in the fresh feed stream is too hard to be ground properly. This condition often occurs when the ore hardness suddenly increases. If ball mill 302 cannot grind the slurry finely enough, cyclone separator 314 will return more oversized particles to ball mill 302. As ball mill 302 experiences a higher feed rate (e.g., fresh feed stream plus recycle stream), the volume of material inside ball mill 302 increases. Eventually, ball mill 302 has so much material that efficiency drops, and in severe overloads, ball mill 302 fills with slurry. During an overload event, the electrical power supplied to ball mill 302 falls rapidly even if the fresh feed stream and water stream have been constant. When this ball mill overload event occurs, prior art MPC models become inaccurate or invalid. Integrated control system 100 utilizes MPC component 102 and expert component 104 in a double-entry control variable technique to drive ball mill 302 and ball mill process 300 back to a stable operating region.

Figure 4:
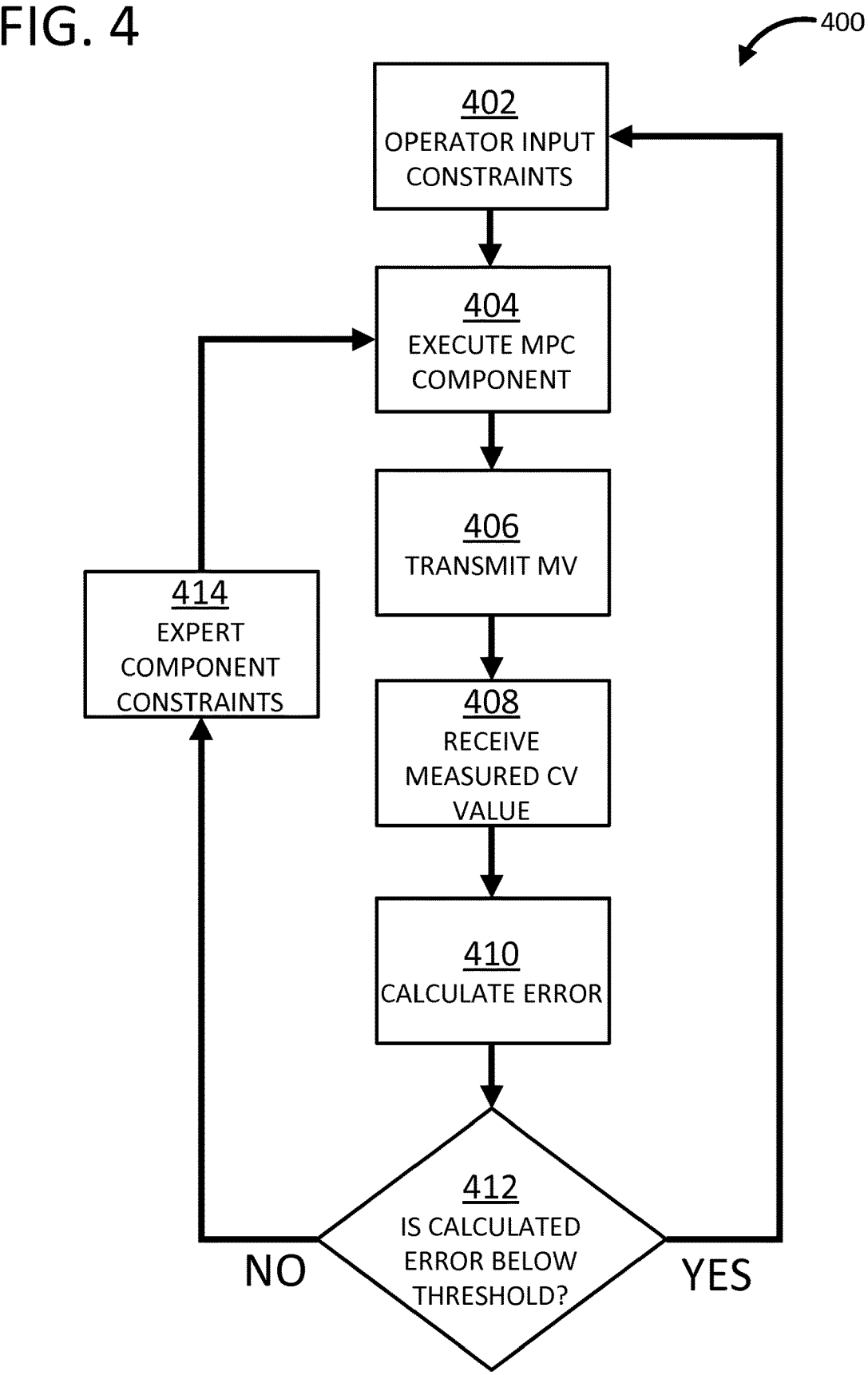
FIG. 4 is a flow chart illustrating an exemplary operation of an integrated control system in accordance with an embodiment of the invention.

FIG. 4 illustrates operation of ball mill process 300 according to a process 400 in which expert component 104 of integrated control system 100 utilizes rules to determine whether ball mill 302 is in a normal operating mode. Ball mill 302 is in a normal operating mode when, for example, model component 202-A utilizing operator input 106 accurately describes at least a portion of ball mill process 300. At step 402, operator input 106 is provided to integrated control system 100. In an exemplary embodiment, an engineer or operator enters CV setpoints and/or constraints as input value 120, which is then received by MPC component 102 and expert component 104 as operator input 106. Exemplary CV constraints and setpoints include, but are not limited to, maximum equipment power limits (e.g., maximum power limit of ball mill 302), ball mill process 300 temperatures, and product quality setpoints or constraints (e.g., particle density as measured by density sensor 312, particle size as measured by particle size sensor 316). In an embodiment, operator input 106 is electronic data carried by a communicative connection, including those that operate according to analog, digital, pulse, serial, and/or parallel techniques, such as the HART® communications protocol, for example.

Referring again to FIG. 4, MPC component 102 executes at step 404. In an embodiment, MPC component 102 uses mathematical models to calculate optimal manipulated variable values (e.g., fresh feed rate in ball comminution process 300 manipulated by fresh feed valve 318) in order to maximize an objective function (e.g., profit of ball mill comminution process 300) over a defined time horizon. When the process 400 advances from step 402 to step 404, MPC component 102 utilizes constraints and/or setpoints provided by operator input 106. For example, MPC component 102 executes model component 202-A to calculate how to optimally move the manipulated variables, account for ball mill 300 process interactions, and keep other controlled variables within constraints or at setpoints provided as operator input 106.

The MPC component 102 transmits manipulated variable 112 to ball mill process 300 at step 406. Exemplary manipulated variables include, but are not limited to, fresh feed rate into ball mill 302 (e.g., controlled by fresh feed valve 318) and fresh water addition to discharge sump 308 (e.g., controlled by water valve 306). In an embodiment, manipulated variable 112 is electronic data carried by a communicative connection, including those that operate according to analog, digital, pulse, serial, and/or parallel techniques, such as the HART® communications protocol, for example. Manipulated variable 112 is received by devices in ball mill process 300, such as fresh feed valve 318 and water valve 306, for example. Fresh feed valve 318 then manipulates the fresh feed of slurry into ball mill 302 and water valve 306 manipulates the flow of water into discharge sump 308. In this manner, integrated control system 100 manipulates aspects of ball mill process 300 to effect physical changes.

With continued reference to FIG. 4, integrated control system 100 receives a measured CV value from devices of ball mill process 300 as feedback input 110. For example, expert component 104 receives data representing a value of electrical power applied to ball mill 302 from ball mill sensor 304. At steps 410 and 412, expert component 104 executes rules to determine whether ball mill 302 is in a normal operating mode (e.g., whether model component 202-A utilizing operator input 106 accurately describes ball mill 302). In an embodiment, the techniques described in U.S. Pat. No. 7,591,440, the disclosure of which is incorporated herein by reference, are applied for this purpose. In another embodiment, expert component 104 calculates an error or percentage error between the value of the ball mill 302 power CV predicted by model component 202-A and the actual measured value of the ball mill 302 power provided by feedback input 110, as shown by step 410. At step 412, expert component 104 determines whether the calculated error is less than a defined acceptable error threshold. When the calculated error is less than the error threshold, ball mill 302 is determined to be in a normal operating mode in which MPC component 102 utilizing operator input 106 (e.g., CV 1a) is accurate and can control ball mill process 300 well enough to achieve objectives of ball mill process 300. In an embodiment, process 400 then advances back to steps 402 and 404 where MPC component 102 utilizes operator input 106 (e.g., CV 1a) to control ball mill process 300. In another embodiment, process 400 advances to step 416 where constraints provided by expert component 104 as expert input 108 (e.g., CV 1b) are set wide so as not to contribute to the objective function value implemented by model component 202-A.

When the rules executed by expert component 104 determine that ball mill 302 is approaching an overload condition, error threshold (e.g., the error calculated at step 412 is equal to or greater than the defined acceptable error threshold), potential mode change, or the like, process 400 advances to step 416 where constraints provided by expert component 104 are utilized by MPC component 102. In an embodiment, the techniques described in U.S. Pat. No. 7,591,440 are applied for this purpose. In a further embodiment, ball mill 302 (FIG. 3) is in a normal operating mode but approaching an overload condition (i.e., at an incipient overload operating point) where MPC component 102 utilizing operator input 106 (e.g., CV 1a) starts to lose accuracy, but is sufficiently accurate for control. At this operating point, process 400 advances to step 416 where expert system 104 provides new constraints as expert input 108 (e.g., CV 1b) that are more narrow than the constraints provided by operator input 106 (e.g., CV 1a). These new expert input 108 constraints contribute, and the operator input 106 constraints no longer contribute, to mathematical models implemented by MPC component 102. After these new expert input 108 constraints are received, process 400 proceeds to step 404 where MPC component 102 then recalculates the objective function and optimum manipulated variable trajectories, taking into account the newly written expert input 108 constraints provided by expert component 104, according to an embodiment. Process 400 then proceeds to step 406 where integrated control system 100 utilizes control signals to direct devices in ball mill process 300 to adjust such that the manipulated variable values are adjusted according to the optimum manipulated variable trajectories. For example, integrated control system 100 determines a control value and sends a control signal representing the control value to fresh feed valve 318 to regulate the flow of fresh feed slurry into ball mill 302. Accordingly, the fresh feed value is adjusted and ball mill 302 is moved away from an incipient overload condition. In another embodiment in which ball mill 302 enters an overloaded operating point, MPC component 102 utilizing operator input 106 is too inaccurate to control ball mill 302 and expert input 108 from expert component 104 is utilized to force MPC component 102 to take quick action to avoid an overload.

In an embodiment, model component 202-A executes a mathematical model utilizing only combined input 216-A (e.g. operator input 106 and feedback input 110) to determine a value of manipulated variable 112-A that represents a manipulation of fresh feed valve 318 to control the fresh feed rate into ball mill 302. Integrated control system 100 transmits data representing that value to fresh feed valve 318. Ball mill sensor 304 provides data as feedback input 110 to model component 202-A and expert component 104. When expert component 104 determines that ball mill 302 is operating at an incipient overload point, expert component 104 provides expert input 108 to model component 202-A. Model component 202-A uses expert input 108 to create a new value of manipulated variable 112-A (e.g., a physical change carried out by fresh feed valve 318) that will put ball mill 302 back into a stable operating region. Integrated control system 100 transmits data representing that new value to fresh feed valve 318. Fresh feed valve then physical alters the fresh feed rate into ball mill 302 and ball mill 302 returns to a stable operating region.

Figure 5:
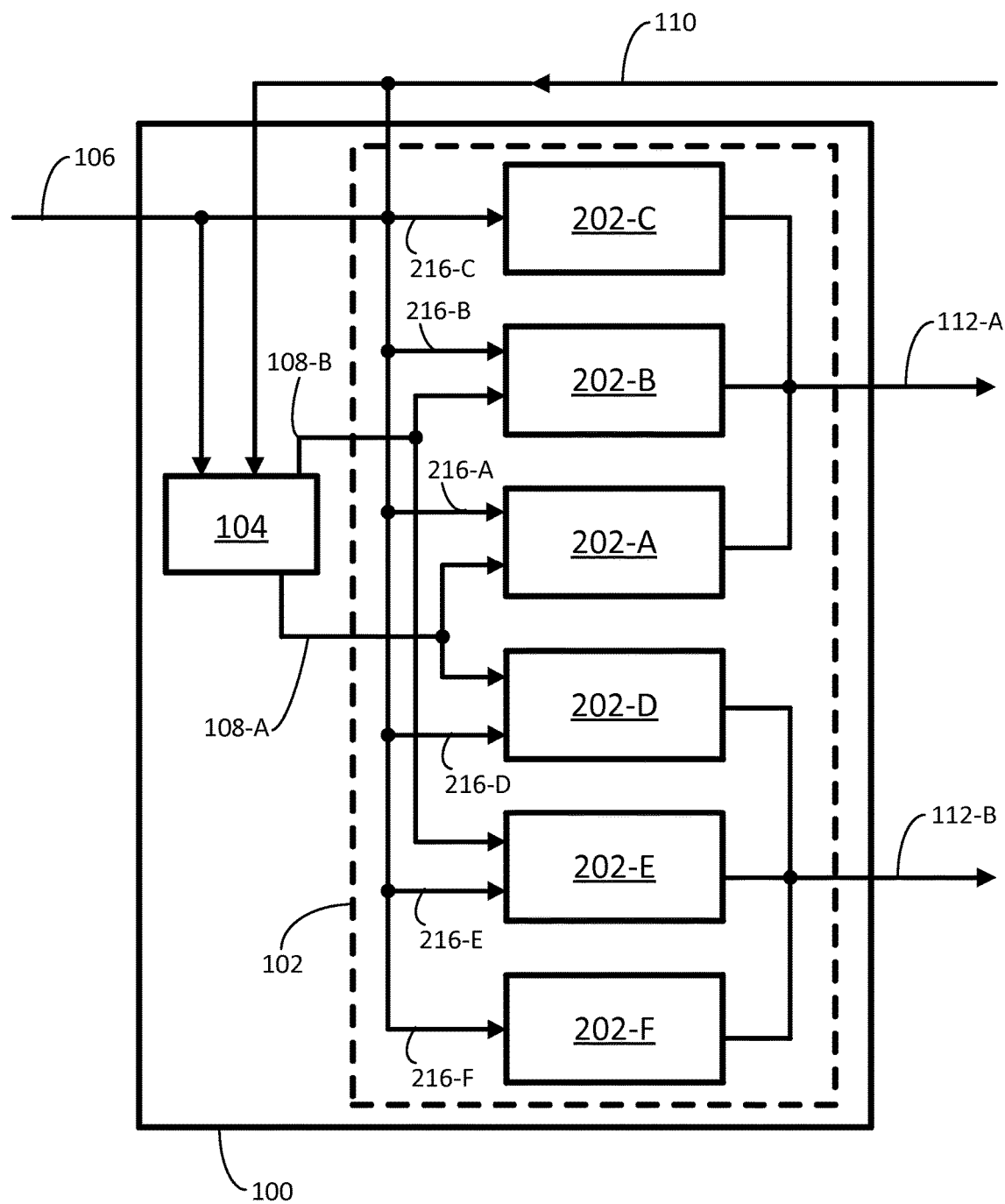
FIG. 5 is a diagram of a multiple double-entry control variable integrated control system in accordance with an embodiment of the invention.

FIG. 5 illustrates an integrated control system 100 utilizing more than one double-entry control variable model component. Model component 202-A is adapted for receiving combined input 216-A and expert input 108-A. Model component 202-D is adapted for receiving combined input 216-D and expert input 108-A. Model component 202-B is adapted for receiving combined input 216-B and expert input 108-B. Model component 202-E is adapted for receiving combined input 216-E and expert input 108-B.

In an exemplary embodiment, expert input 108-A represents constraints on ball mill 302 power set by expert component 104 (e.g., CV 1a), and combined input 216-A represents constraints on ball mill 302 power set by an operator or engineer of ball mill comminution process 300 (e.g., CV 1b). Model component 202-A utilizes expert input 108-A and combined input 216-A to determine adjustments to fresh feed valve 318 (e.g., fresh feed rate manipulated variable) and water valve 306 (e.g., discharge sump 308 water addition manipulated variable). Expert input 108-B represents constraints on the density of the process fluid entering cyclone separator 314 set by expert component 104 (e.g., CV 2a), and combined input 216-B represents constraints on the density of the process fluid entering cyclone separator 314 set by an operator or engineer of ball mill process 300 (e.g., CV 2b). Model component 202-B utilizes expert input 108-B and combined input 216-B to determine adjustments to fresh feed valve 318 (e.g., fresh feed rate manipulated variable) and water valve 306 (e.g., discharge sump 308 water addition manipulated variable). In this manner, expert component 104 outputs a setpoint or constraint for each double-entry CV (e.g., CV 1a and CV 2a). MPC component 102, including model components 202, calculates the optimum trajectories for the manipulated variables (e.g., adjustments to fresh feed valve 318 and water valve 306) while satisfying all constraints and setpoints, as discussed herein.

In an embodiment, integrated control system 100 utilizes a double-entry control variable approach to drive a process (e.g., ball mill process 300) to the most profitable operating point. Costs are assigned to manipulated variables and CVs and an optimum operating point with the CV constraints is found, if feasible. For example, if the end product of a process is sold out and the unit to be controlled is a bottleneck, then increasing the feed rate will increase profits. Increased energy costs and perhaps equipment wear will reduce the profit. The economic optimizer will calculate the location of the point of maximum profit (e.g., an intersection of CV constraints). Prior art control systems are used to run a process at some point away from the true optimum (i.e., with a "cushion") so that important constraints are not violated. Integrated control system 100 stabilizes process operation in an embodiment and moves the operation closer to the true constraints and optimum location, while monitoring and adjusting the process more frequently and accurately than a human operator.

In another embodiment, integrated control system 100 utilizes a cost function that includes incremental changes to feed rates, steam and electricity consumption, and intermediate product values. In addition, other factors that drive unit operation are capable of being broken down into cost factors and included in the cost function. Environmental constraints, when applicable, are assigned high costs and high priorities, according to one embodiment.

In a further embodiment, integrated control system 100 maps out all constraints and operates within these constraints in order to calculate the optimum operating point. In an aspect, all constraints become application CVs. In yet another embodiment, integrated control system 100 utilizes unit dynamics and interactions.

In an embodiment of the present invention, an APC-based approach refers to the entire application of, and relationships between, variables (i.e., all CVs, MVs, and FVs), objective functions, setpoints, constraints, conditions, inputs, outputs, and the like collectively as a model.

In another embodiment of the present invention, a mathematical model representing at least a subset of a process may correspond to a response curve model.

A case study illustrating some of the design concepts described above is presented here. The case study involves an iron ore concentrator plant.

Case Study Overview

Figure 6:
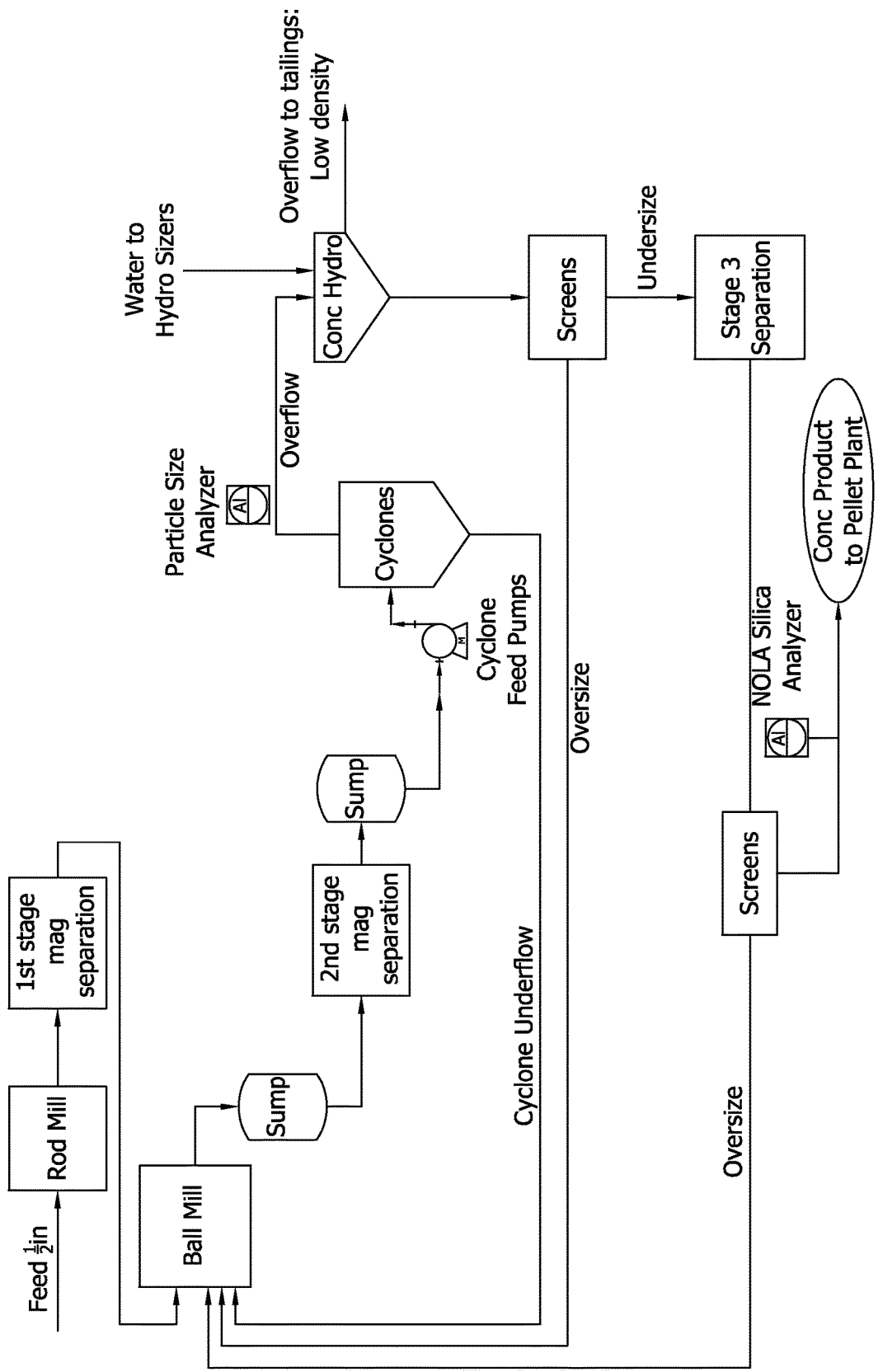
FIG. 6 is a diagram of an exemplary ball mill process in accordance with an embodiment of the invention.

The unit that was put under APC control is a comminution and separation line in an iron ore concentrator plant. FIG. 6 presents a simplified process flow diagram (PFD). Ore is fed into a rod mill and then to a closed circuit ball mill comminution process. The overflow from the cyclones is routed to a concentrate hydrosizer ("Conc Hydro") unit where particles are separated based on density. Three stages of magnetic separation are performed and there are several classification operations using screens.

The product quality specifications are the concentrate silica composition and a downstream moisture content (not shown). There is a multi-stream Nuclear On-Line Analyzer (NOLA) instrument that measures the silica concentration. There is a multi-stream on-line particle size analyzer on the cyclone overflow stream.

Not shown are numerous lines where water is added to the circuit; some of these lines have control valves without flow meters and other lines only have manual valve adjustments without position or flow measurement feed back to the DCS.

APC Design Procedure

The procedure outlined herein begins with understanding the unit's economic driving factors. The process engineers and operations management had a clear and accurate view of the economic drivers: maximize feed until equipment constraints or product quality limits were encountered. The console operators all understood the economic drivers.

Variations in operation between crews were analyzed next. There was a wide consensus that the operating crews ran the unit differently. This was proven by an analysis of the process data.

The head operator spent much of his time at the console but was also out in the field for considerable lengths of time making manual adjustments and assisting the field (outside) operators. The instrumentation was not extensive, so vision and touch were required to evaluate portions of the unit performance. Furthermore, there were extensive lag times between making manual adjustments and observing the results in the final product. Finally, the unit feed composition could vary quickly and significantly. This complexity led to disagreements about the best way to operate the unit even between operators that had been on adjacent shifts for years or decades.

A difference in the size of the operating "cushion" was found during the data analysis. In general, the operating crews were very experienced and ran the unit well, but it was clear that skill levels varied between crews. Furthermore, the unit could be run at or very close to unsustainably high feed rates. This unsustainable feed rate could often be maintained for well over an hour while the circuit slowly loaded up. As is typical with comminution circuits, if the circuit reaches overload conditions, the feed must be abruptly reduced until the condition clears. A skilled operator could run the unit close to the maximum sustainable feed rate, but had to pay close attention to the unit in case the feed composition changed and pushed the circuit into an overloaded condition.

The APC application engineer made a significant effort to talk to all of the head operators about equipment constraints and the factors that stop them from raising feed rate. Process engineering and management were knowledgeable about the unit and also had insights.

The reasoning behind setting of important unit variables such as feed, valve positions for unmeasured water streams, water flow rates, etc. was also addressed. The console operator was well informed and made all necessary adjustments in this unit. Constraints downstream of the unit were incorporated into the decision making process; the downstream pellet plant operators and the comminution/separation unit operators shared the same control room and communicated well.

However, many of the actions taken by the console operator were dictated by information available in the field and not transmitted to the DCS. The APC engineer had to understand the process and decide if an application could improve the unit operation given the limited amount of information and control available at the DCS. Extensive discussions with operations and engineering as well as an analysis of the data led to the conclusion that a limited scope application could be both profitable and useful to the operators. Manual adjustments in the field would be treated as unmeasured disturbances. Models were created to substitute for human field observations when possible. When field observations could not be modeled and were important inputs to control logic, then that portion of the unit was removed from the application scope.

For example, the quality of the concentrate hydrosizer overflow was very important to unit operation; low density particles with high silica concentrations were sent to tailings which reduced the product silica concentration but also reduced yield. There was no practical method to install an instrument on this stream and the overflow could not be accurately modeled. The control over the hydrosizer was left to the console operator. The water addition to the hydrosizer could be roughly modeled and was put into the application as a disturbance variable.

Instrumentation accuracy and reliability was thoroughly investigated. In this unit, the analyzers were of major importance and had a significant impact on the application design (FIG. 6). The unit had both particle size analyzers and silica analyzers. Particle size analyzers offer good insight into the operation of comminution circuits. However, they require a significant maintenance commitment and would have to be upgraded and re-commissioned in order to be included in the APC application. The product NOLA silica analyzer determines the unit's product quality limits and is hence critical to the operation. Interviews with all concerned parties confirmed that the NOLA analyzer was well maintained and reasonably reliable.

There were strong opinions regarding the particle size analyzer's potential contribution to the APC project benefits. After discussions with all the involved organizations, a consensus decision was reached that the particle size analyzer would not be included in the APC design.

APC Design and Results

The issue of detecting and controlling circuit loading was critical to the success of the project. The unit was often operated in regions where circuit loading was unimportant because other unit constraints were active. However, the unit could quickly move into a region where circuit loading constrained the feed rate when the ore quality changed or equipment degraded.

A proprietary method using expert system rules was used to detect circuit overload conditions. For example, the techniques described in U.S. Pat. No. 7,591,440, incorporated by reference above, may be applied for this purpose. This expert system was integrated into a model predictive controller (MPC) (e.g., integrated control system 100). For example, the techniques described in U.S. Provisional Application Ser. No. 61/975,442, the disclosure of which is hereby incorporated by reference, may be utilized for this purpose. The design allowed the MPC to operate in regions where its models were accurate and allowed the expert system to feed-back information regarding circuit stability and loading.

The described design procedure allowed all organizations involved with running the unit the opportunity to give design input. This resulted in some of the most respected operators becoming APC proponents and utilizing the application whenever possible. The process engineering department also saw the direct economic benefits of the application and was active in training and improving APC utilization.

The benefits of the APC project were rigorously analyzed and the project payback was conservatively estimated to be 34 days.

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a special purpose computer or special purpose processing device to perform a certain function or group of functions.

Aspects of the invention are described in the general context of computer-executable instructions, such as program modules, stored one or more tangible, non-transitory storage media and executed by one or more processors or other devices. Generally, program modules include, but are not limited to, routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with processor or computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A process control system for a process, the process control system configured for use with an actuating device controlling a control output in the process, comprising:
   a model predictive control (MPC) component configured to implement a mathematical model describing a process, said MPC component implementing the mathematical model utilizing an operator value to generate a control output, the operator value corresponding to a variable of the process; and
   an expert component configured to implement one or more rules independent of the MPC component, said rules indicating an incipient, unpredictable overload operating point corresponding to the process entering into an overload region in which the mathematical model cannot accurately predict an effect of the control output on the process utilizing the operator value, said expert component providing a corrective expert value to the MPC component to generate a corrective control output in the overload region, the expert value corresponding to the variable of the process,
   wherein the MPC component is configured to provide the corrective control output to the actuating device in the overload region, said actuating device implementing the corrective control output in the process independent of the MPC component.

2. The process control system of claim 1, further comprising a sensing device providing a physical value of the variable of the process.

3. The process control system of claim 2, wherein the expert component is further configured to implement the rules utilizing the physical value of the variable of the process, and wherein the MPC component further implements the mathematical model utilizing the physical value of the variable of the process.

4. The process control system of claim 1, wherein the expert value and the operator value are setpoints.

5. The process control system of claim 1, wherein the rules comprise fuzzy logic control (FLC).

6. A process control system for a process, the process control system configured for use with an actuating device controlling a subset of the process, comprising:
   a memory device having stored thereon a first constraint value of a first instance of a controlled variable (CV) of a process set by an operator of the process, a second constraint value of a second instance of the CV of the process set by an expert system, and a mathematical model, said model representing at least a subset of the process and having an objective function for determining an optimal trajectory of at least one manipulated variable (MV) of the process;
   a sensing device for measuring a present value of the MV; and
   a processor coupled to the memory device and the sensing device, said processor executing program code configured to:
      implement one or more rules, wherein the rules are independent of the mathematical component and wherein the rules are configured to predict a future value of the CV as a function of past measured values of the MV and the present value of the MV, wherein the future value cannot be accurately predicted by the mathematical model,
      when the predicted future value indicates an incipient overload operating point corresponding to the process entering into an overload region in which the mathematical model cannot accurately predict, determine an error value of the CV,
      determine control values as a function of the model and the first constraint value set by the operator of the process when the error value is less than a threshold value,
      determine control values as a function of the model and the second constraint value set by the expert system when the error value is greater than or equal to the threshold value, and
      provide the determined control values to the actuating mechanism in the overload region for controlling at least the subset of the process in accordance with the determined control values.

7. The process control system of claim 6, further comprising the actuating mechanism, wherein the actuating mechanism controls at least the subset of the process in accordance with the provided control values.

8. The process control system of claim 6, further comprising a second sensing device for measuring a present value of the CV, wherein the processor receives the present value of the CV from the second sensing device for determining the error value of the CV.

9. The process control system of claim 6, wherein the mathematical model uses model predictive control.

10. The process control system of claim 6, wherein the first constraint value and the second constraint value are setpoints.

11. The process control system of claim 6, wherein the program code is further configured to predict the future value of the CV as a function of one or more feed-forward variables (FV).

12. The process control system of claim 6, wherein the program code is further configured to predict the future value of the CV as a function of one or more past values of the CV.

13. The process control system of claim 6, wherein the control values modify the MV such that the process operates at an optimum operating point.

14. A process control system for a process, the process control system configured for use with an actuating device controlling a subset of the process, comprising:
   a model structure comprising a first Model Predictive Control (MPC) model representing at least a subset of a process, a second MPC model representing at least the subset of the process, a first instance of a first controlled variable (CV) of the process corresponding to the first MPC model, a second instance of the first CV, and a first instance of a second CV of the process corresponding to the second MPC model, the first MPC model predicting the first CV responsive to a manipulated variable (MV) of the process, the second MPC model predicting the second CV responsive to the MV, the first instance of the first CV being constrained by a first constraint value, and the second instance of the first CV being constrained by a second constraint value;

an objective function module for determining an optimal trajectory of the MV;

a rules module comprising one or more rules independent of the MPC component for identifying a mode change including an incipient overload operating point in which at least one of the first MPC model and the second MPC model cannot accurately predict their respective CVs;

a processor executing program code configured to determine the optimal trajectory of the MV according to the objective function module and the CVs and provide the determined optimal trajectory of the MV to the actuating mechanism for controlling at least the subset of the process in accordance therewith in the overload region, wherein the second instance of the first CV does not contribute to the objective function module when each of the first MPC and the second MPC predict their respective CVs with acceptable accuracy, and wherein the first instance of the first CV does not contribute to the objective function module when at least one of the first MPC and the second MPC cannot predict their respective CVs with acceptable accuracy.

15. The process control system of claim 14, wherein the first constraint value is set by an operator of the process control system and the second constraint value is set by an expert system.

16. The process control system of claim 14, further comprising:

a first sensing device for measuring a present value of the MV;

a second sensing device for measuring a present value of the first CV and the second CV, wherein the processor receives the present value of the MV from the first sensing device and the present values of the first CV and the second CV from the second sensing device for use in predicting the CVs; and the actuating mechanism, said actuating mechanism controlling at least the subset of the process in accordance with the provided optimal trajectory of the MV.

17. The process control system of claim 14, wherein the first MPC model and the second MPC model predict their respective CVs responsive to at least one feed-forward variable (FV).

* * * * *